United States Patent
Chang et al.

(10) Patent No.: US 12,231,874 B2
(45) Date of Patent: Feb. 18, 2025

(54) OCCUPIED TARGET CHANNEL NOTIFICATION FOR CONDITIONAL HANDOVERS WITH UNLICENSED FREQUENCY BANDS

(71) Applicants: Kyocera Corporation, Kyoto (JP); Henry Chang, San Diego, CA (US); Masato Fujishiro, Yokohama (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 411 days.

(21) Appl. No.: 17/634,049

(22) PCT Filed: Aug. 11, 2020

(86) PCT No.: PCT/US2020/045727
§ 371 (c)(1),
(2) Date: Feb. 9, 2022

(87) PCT Pub. No.: WO2021/030324
PCT Pub. Date: Feb. 18, 2021

(65) Prior Publication Data
US 2022/0330107 A1  Oct. 13, 2022

(51) Int. Cl.
*H04W 36/08* (2009.01)
*H04W 36/30* (2009.01)
*H04W 36/36* (2009.01)
*H04W 36/00* (2009.01)

(52) U.S. Cl.
CPC .......... *H04W 36/08* (2013.01); *H04W 36/30* (2013.01); *H04W 36/362* (2023.05); *H04W 36/0072* (2013.01)

(58) Field of Classification Search
CPC .. H04W 36/0072; H04W 36/08; H04W 36/30
USPC ................................ 370/329, 400, 401, 405
See application file for complete search history.

(56) References Cited

U.S. PATENT DOCUMENTS

2019/0223057 A1  7/2019  Park et al.
2021/0112475 A1*  4/2021  Kim .................. H04W 36/0058

FOREIGN PATENT DOCUMENTS

WO  WO-2018175721 A1 *  9/2018  ............ H04W 24/08

OTHER PUBLICATIONS

Interdigital Inc.; "Mobility for NR-U," R2-1811455; 3GPP TSG-RAN WG2 Meeting #103; Aug. 9, 2018; Gothenburg, SE.
(Continued)

*Primary Examiner* — Dang T Ton

(57) ABSTRACT

A user equipment (UE) device receives, from base station providing a source cell, a conditional handover command identifying a target frequency on a target cell for conditional handover. After determining that conditions have been met for the conditional handover, the UE device observes the target frequency. If the target frequency is occupied, the UE device transmits, to the serving base station, an indication that the target frequency is unavailable for the conditional handover. The indication may include, or be transmitted with, a measurement report.

14 Claims, 7 Drawing Sheets

(56) References Cited

OTHER PUBLICATIONS

LG Electronics Inc.; "Support of conditional handover for NR-U," R2-1905045; 3GPP TSG-RAN WG2 #105bis; Mar. 29, 2019; Xian, CN.
CMCC; "Remaining Issues of LTE Conditional Handover," R2-1905948; 3GPP TSG-RAN WG2 Meeting #106; May 2, 2019; Reno, US.
Kyocera; "MDT procedure for NG-RAN," R2-1906658; 3GPP TSG-RAN WG2 Meeting #106; May 2, 2019; Reno, US.

* cited by examiner

OCCUPIED TARGET CHANNEL NOTIFICATION FOR CONDITIONAL HANDOVERS WITH UNLICENSED FREQUENCY BANDS

CLAIM OF PRIORITY

The present application claims the benefit of priority to Provisional Application No. 62/887,115, entitled "Method For Conditional Handover Recovery in an Unlicensed Network", assigned to the assignee hereof and hereby expressly incorporated by reference in its entirety.

FIELD

This invention generally relates to wireless communications and more particularly to conditional handovers in communication systems using unlicensed frequency bands.

BACKGROUND

Wireless technologies, such as WiFi and Bluetooth, utilize unlicensed frequency bands for communication. In the United States, the unlicensed bands are located in at least the 900 MHz, 2.4 GHz and 5.8 GHz frequency bands. Some communication technologies that have traditionally operated within licensed frequency bands are beginning to use unlicensed bands for some communication. For example, the 3rd Generation Partnership Project (3GPP) has developed Licensed-Assisted Aggregation (LAA) to make use of the free unlicensed bands in conjunction with the licensed band. LAA is very similar to Carrier Aggregation (CA) whereby user equipment (UE) devices can simultaneously access multiple cells at the same time using a primary cell (PCell) and a secondary cell (SCell). The SCell which is typically a small cell, handles much of the broadband load and the PCell which is typically a macro-cell, handles the control signaling. The UE devices do not experience unnecessary increase in handover failures when moving from one small cell to another. As long as the UE device remains connected to the PCell (typically a macro-cell), the UE devices do not declare handover failure even if the connection to the SCell is lost. LAA is designed for fair coexistence among LAA networks deployed by different operators and other non-3GPP technologies. AS a result, 3GPP requires a listen-before-talk (LBT) procedure which is defined as a mechanism by which an equipment applies a clear channel assessment (CCA) check or LBT check before using the unlicensed channel.

A newly developing technology studied by the 3GPP and referred to as New Radio-Unlicensed Standalone (NR-U SA) proposes an NR-based cell operating standalone in unlicensed spectrum and connected to a 5G core network (5G-CN) with priority on frequency bands above 6 GHz. With this system, there is no longer an anchor cell (PCell) that is transmitting in a licensed band. As a result, control signaling for mobility is performed over unlicensed bands.

SUMMARY

A user equipment (UE) device receives, from base station providing a source cell, a conditional handover command identifying a target frequency on a target cell for conditional handover. After determining that conditions have been met for the conditional handover, the UE device observes the target frequency. If the target frequency is occupied, the UE device transmits, to the serving base station, an indication that the target frequency is unavailable for the conditional handover. The indication may include, or be transmitted with, a measurement report.

DETAILED DESCRIPTION

Figure 1:
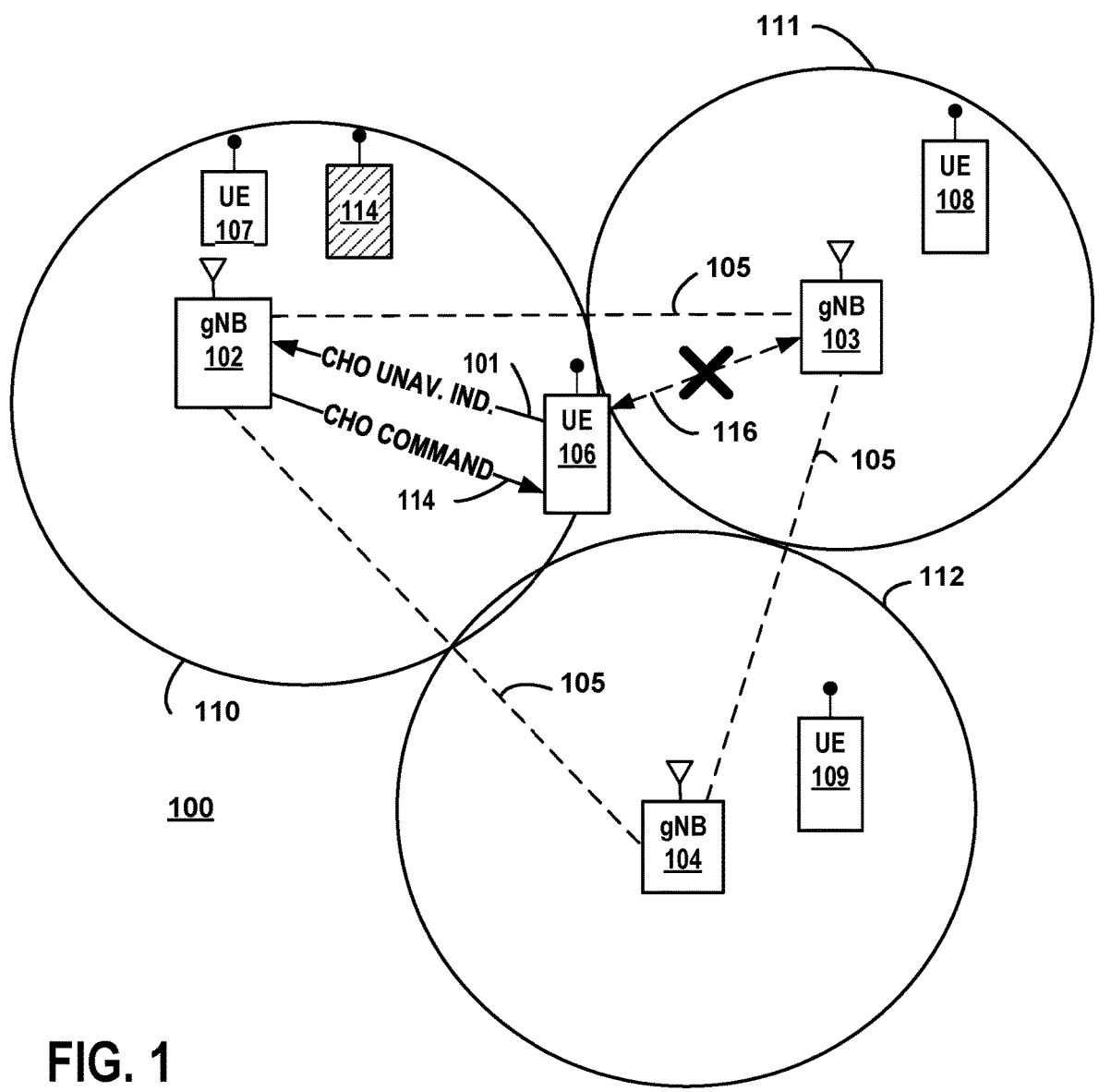
FIG. 1 is a block diagram of an example of a communication system supporting operation in accordance with 3GPP New Radio-Unlicensed Standalone (NR-U SA) and transmission of a CHO-unavailable indication that indicates to the serving base station that the conditional handover cannot be performed.

As discussed above, in a NR-U SA system, control signaling for mobility is performed over unlicensed bands. Since the unlicensed band may be occupied and the UE device must perform LBT procedures prior to any transmission, the UE device may not be able to send the required control signaling in a timely manner. Therefore, one of the distinct differences between LAA and NR-U SA is the lack of a reliable channel for delivery of control signaling critical to reliable operation. Due to the need for LBT operation for every signaling transmission, the reliability and latency of the control signaling may be significantly impacted due to mobility operation in the unlicensed band. Currently, the NR mobility procedure is designed to combat radio link problems and/or interference from neighboring cells but is not equipped to handle the lack of a reliable channel due to channel occupancy by other systems and devices. In particular, handovers are challenging since the existing NR based mobility is largely based on LTE with the assumption that licensed spectrum will be used for control signaling. It is difficult to determine whether a signaling failure is due to radio link issues or whether the channel is just temporary occupied. This issue is especially critical under mobility since it is expected that handovers are completed prior to T310 expiry once the UE device receives N310 consecutive out-of-sync indications from the lower layer. With current systems, upon T310 expiry, the UE device will transition to the IDLE state regardless of whether the cause of the physical layer problem was due to radio link issue or an occupied channel.

One of the handover mechanisms being considered for NR systems includes a Conditional Handover (CHO). A CHO provides the UE device to ability to perform a handover in the future without providing a new measurement report. With CHO, the threshold for triggering the measurement report may be different from the existing HO. In particular, NR-U specific event triggers such as channel occupancy and RSSI measurements may be used. The early decision by the serving gNB to send the CHO Command allows the UE device some flexibility on when to access the target cell as compared to the conventional Handover (HO) procedure since with a conventional HO, it may not be possible to send the measurement report when required due to LBT (and similarly with the existing HO command send by the serving gNB). The measurement report and CHO command are performed before the HO is required. Although the selection of the target gNB is still based on the configured measurement threshold, the main advantage of CHO is that the UE device is not required to send the measurement report to the source cell and receive the CHO command when the measured signal strength indicates a HO needs to happen right away. Therefore, there is flexibility in terms of both LBT and measurement threshold (simultaneously).

Conventional systems and proposals, however, are limited in that the serving cell is unaware of situations where the UE device cannot perform the CHO because the target frequency is occupied or otherwise unavailable. With conventional CHO techniques, a pending CHO is only resolved by a successful handover or a deconfiguration of CHO by the serving cell performed using RRC signaling. Therefore, if the UE device cannot complete the handover, it must wait for the source cell to either deconfigure the CHO or reconfigure the UE device with an updated HO/CHO. Since there is no mechanism for informing the serving cell of an occupied channel at the target frequency that was identified in the CHO command, the source cell may not know the configured CHO is not working for the UE device.

For the examples discussed herein, however, the UE device transmits, to the serving base station, an indication that the target cell is unavailable for the conditional handover. The UE device receives, from base station providing a source cell, a conditional handover command identifying a target cell for conditional handover. After determining conditions have been met for the conditional handover, the UE device determines whether the target cell is available for the conditional handover. If the target cell is not available, the UE device notifies the serving base station. In some examples, the indication identifies each target cell frequency determined to be unavailable for the conditional handover. In some situations, UE device transmits a measurement report indicating at least an RSSI measurement and a channel occupancy indicator for each target cell frequency determined to be unavailable for the conditional handover. In other examples, the conditional handover command indicates a source cell frequency for the conditional handover and the UE device performs the conditional handover to the source cell frequency in response to determining the target cell is unavailable for the conditional handover. Also, the UE device can perform an MDT logging procedure that includes logging information that identifies at least one target cell frequency unavailable for the conditional handover. The logged information may also include a channel occupancy of at least one target cell frequency, RSSI values, a location, a time stamp, a cell ID, a WLAN SSID and/or a BSSID.

FIG. 1 is a block diagram of an example of a communication system 100 supporting operation in accordance with 3GPP New Radio-Unlicensed Standalone (NR-U SA) and transmission of a CHO-unavailable indication 101 that indicates to the serving base station that the conditional handover cannot be performed. For New Radio-Unlicensed standalone deployments, mechanisms for inter-cell handover between NR-U and NR-U and Inter-RAT handover between NR-U and LTE are needed. Extensions of mobility-related measurement reporting for unlicensed operation including channel occupancy indication and RSSI measurements will also be required. The communication system 100, therefore, may operate in accordance with one or more revisions of the 3GPP NR-U SA communication specification and includes mechanisms for managing conditional handover failures due to occupied unlicensed target channels. The communication system 100 includes a plurality of base stations 102-104 providing wireless service to UE devices 106-109 within coverage areas 110-112. The UE devices 106-108 communicate with the base stations in one or more unlicensed frequency bands. In some case, one or more unlicensed frequency channels belonging to the same or different bands may be used at each of the based stations 102-104. Furthermore, the unlicensed frequency channels may be provided to each UE device simultaneously using carrier aggregation. Therefore, the UE devices 106-108 transmit uplink signals in an unlicensed frequency band and receive downlink signals in an unlicensed frequency band. Typically, the same unlicensed frequency band is used for uplink and downlink although different bands can be used in some situations. An unlicensed frequency band is any frequency band that does not require the operator to file directly with a governmental agency regulating frequency spectrum, such as the Federal Communications Commission (FCC), in order to use the band. Examples of unlicensed frequency bands U.S. include the 900 MHz, 2.4 GHz and 5.8 GHz. Currently developing systems contemplate using at least the 6 GHz band which in the U.S. ranges between 5925 MHz and 7125 MHz and between 5925 MHz and 6425 MHz, in Europe. Portions of bands can also be used. The range 5150-5925 MHz, or parts thereof, is potentially available for license-assisted access to unlicensed operation bands. This frequency range can be operated under a license-exempt regime or ISM but must be shared with existing mobile services and other incumbent services. The quality of service offered by a licensed regime, therefore, cannot be matched. Hence, unlicensed access is viewed as complementary, and does not reduce the need for additional allocations for licensed operation in view of the increased demand for wireless broadband access. Other unlicensed frequency bands and portions of frequency bands can also be used. For the examples, herein, operation in the unlicensed frequency bands requires listen-before-talk (LBT) where a transmitting device must observe a channel to determine that is not in use before transmitting in that channel.

The base stations 102-104 are any transceivers that provide wireless service in a coverage area and can perform the functions described herein. The base stations 102-104 may be referred to as access points, access nodes, transceiver nodes, eNodeB, eNB, gNB and other terms depending on the particular system and application. For the example, the base stations 102-104 are in communication with each other through a backhaul 105 which may include wired and/or wireless portions.

For the example of FIG. 1, a UE device 106 is receiving wireless service from a first base station (first gNB) 102 and receives a conditional handover (CHO) command 114. The serving cell for the UE device 106, therefore, is provided by the first base station 102. For the example, the UE device 106 transmits a measurement report to the first base station when the uplink channel for transmission is clear. Therefore, the UE device 106 performs a listen-before-talk (LBT) procedure and determines when the channel is clear. The UE device 106 may measure an energy level present in the channel and compare the measured level to a threshold over a specified time period to determine if the channel is occupied. The channel may be occupied by other UE devices operating in the system 100 or by other devices 114 using the unlicensed band that are not communicating within the system 100. Examples of suitable measurement reports and measurement techniques include conventional measurements for CHO management. The first base station 102 processes measurement report and sends a CHO command 114 to the UE device 106 which instructs the UE device 106 to perform the CHO to a second base station 103 when conditions for the CHO have been met.

After receiving the CHO command 114, the UE device 106 continues to monitor signal conditions to determine whether the CHO should be executed. For example, the UE device 106 may monitor the signal strength of the serving cell provided by the first base station 102 and, when the signal strength drops below a threshold, determine the conditions have been met for the CHO. When conditions the CHO are met, the UE device 106, performs the LBT procedure for the designated frequency for the CHO to the target cell which is provided by the second base station 103. For the example of FIG. 1, the UE device 106 determines from the LBT procedure that the channel at the designated frequency is occupied and no transmission is allowed. Accordingly, the CHO 116 to the second base station 103 is not performed. The UE device 106 transmits the CHO-unavailable indicator 101 the first base station 102 to notify the serving base station 102 that the CHO cannot be performed. The indicator may be a 1-bit indicator that CHO cannot be performed due to LBT failure. In some circumstances, the CHO-unavailable indicator 101 may include a measurement report indicating one or more frequencies at the target base station 103 are occupied. The measurement report may include an RSSI measurement and a channel occupancy indicator for each frequency of the target base station 103. In other examples, the conditional handover command indicates a source cell frequency for the conditional handover and the UE device 106 performs the CHO to the source cell frequency in response to determining the target cell is unavailable for the CHO. Also, the UE device 106 can perform an MDT logging procedure that includes logging information that identifies at least one target cell frequency unavailable for the conditional handover. The logged information may also include a channel occupancy of at least one target cell frequency, RSSI values, a location, a time stamp, a cell ID, a WLAN SSID and/or a BSSID. Such information allows the serving base station 102 to efficiently manage CHOs and HOs.

Figure 2:
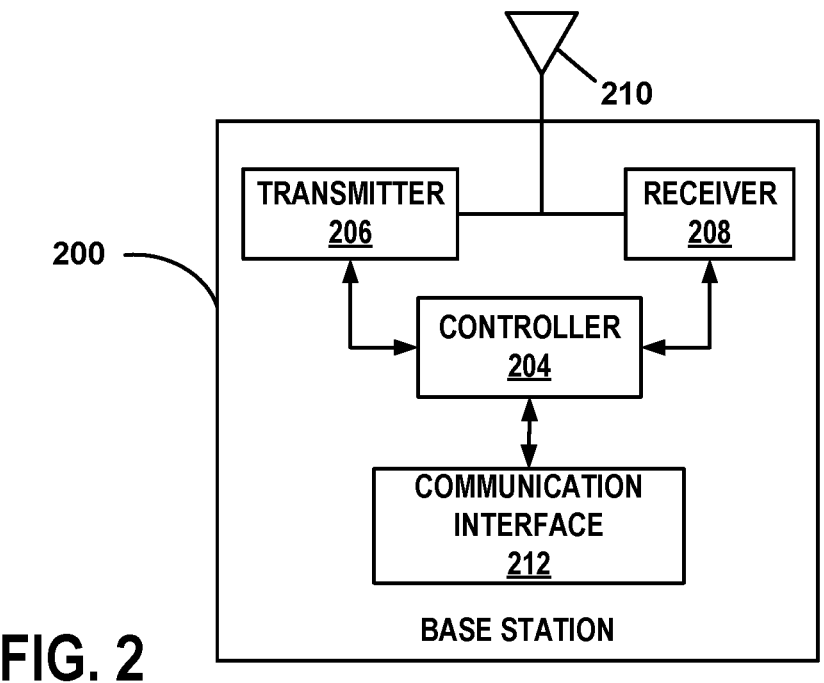
FIG. 2 is a block diagram of an example of a base station suitable for use as each of the base stations.

FIG. 2 is a block diagram of an example of a base station 200 suitable for use as each of the base stations 102-104. The base station 200 includes a controller 204, transmitter 206, and receiver 208, as well as other electronics, hardware, and code. The base station 100 is any fixed, mobile, or portable equipment that performs the functions described herein. The various functions and operations of the blocks described with reference to the base stations 102-104, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device such as a communication device in some circumstances. Although the base station may be referred to by different terms, the base station is typically referred to as a gNodeB or gNB when operating in accordance with one or more communication specifications of the 3GPP directed to (NR-U SA) operation.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

For the example, the base station 200 includes a communication interface 212 for transmitting and receiving messages with other base stations. The communication interface 212 may be connected to a backhaul or network enabling communication with other base stations. In some situations, the link 116 between the base stations 112, 114 may include at least some wireless portions. The communication interface 212, therefore, may include wireless communication functionality and may utilize some of the components of the transmitter 206 and/or receiver 208.

The base station 200 has the capability to observe one or more downlink channels to determine if the channel is currently occupied. In other words, the base station 200 can determine whether other devices are transmitting within the channel. For the examples herein, the receiver 208 detects energy within the channel and the controller makes a determination of whether the measured energy indicates the channel is in use. For example, the measured energy can be compared to a threshold. Other techniques can be used in some circumstances.

Figure 3:
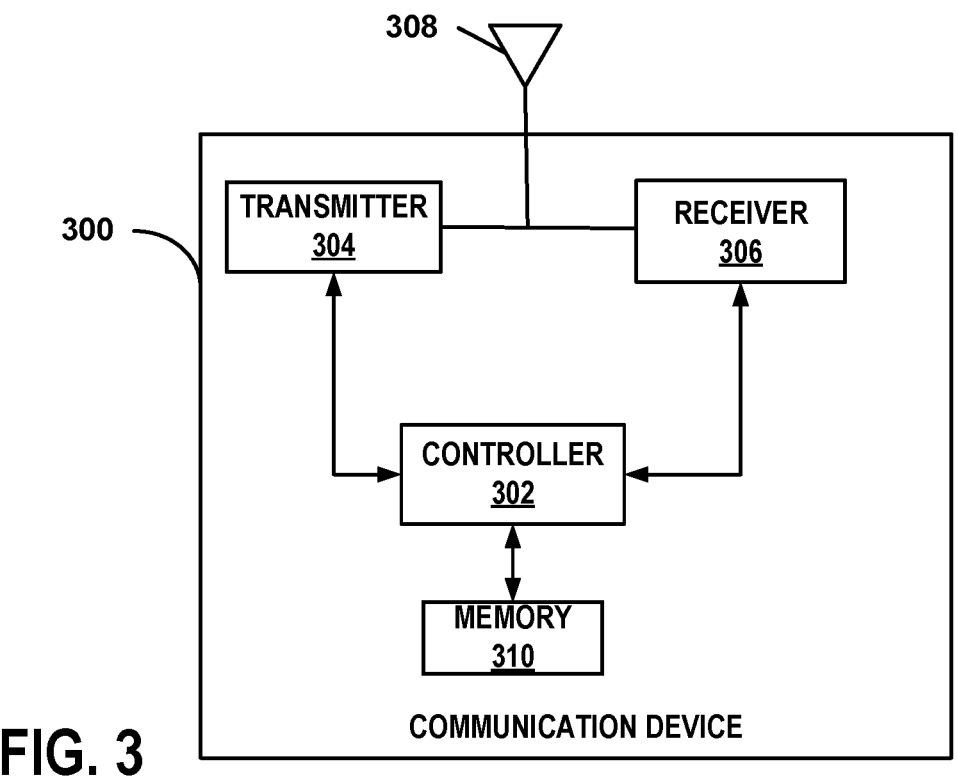
FIG. 3 is a block diagram of an example of a UE communication device suitable for use as each of the communication devices of FIG. 1.

FIG. 3 is a block diagram of an example of a UE communication device 300 suitable for use as each of the communication device 106-109 of FIG. 1. In some examples, the communication device 300 is any wireless communication device such as a mobile phone, a transceiver modem, a personal digital assistant (PDA), a tablet, or a smartphone. In other examples, the communication device 300 is a machine type communication (MTC) communication device or Internet-of-Things (IOT) device. The communication device 300, (106-109), therefore is any fixed, mobile, or portable equipment that performs the functions described herein. The various functions and operations of the blocks described with reference to communication device 300 may be implemented in any number of devices, circuits, or elements. Two or more of the functional blocks may be integrated in a single device, and the functions described as performed in any single device may be implemented over several devices.

The communication device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

The UE communication device 300 has the capability to observe one or more uplink channels to determine if the channel is currently occupied. In other words, the UE communication device 300 can determine whether other devices are transmitting within the channel. For the examples herein, the receiver 304 detects energy within the channel and the controller makes a determination of whether the measured energy indicates the channel is in use. For example, the measured energy can be compared to a threshold. Other techniques can be used in some circumstances.

Figure 4:
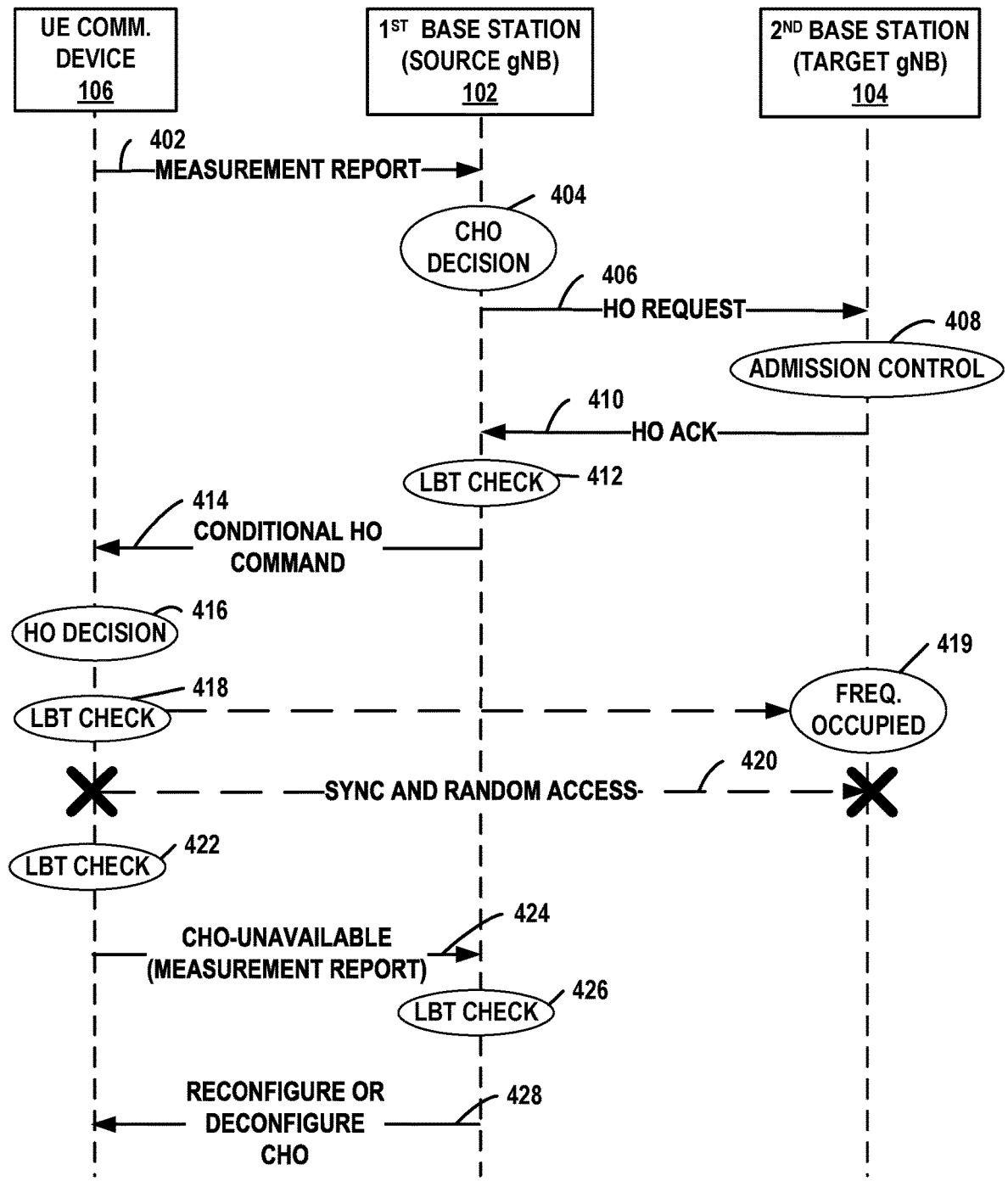
FIG. 4 is a timing diagram of communication for an example where the target frequency (channel) identified in a conditional handover is determined to be occupied.

FIG. 4 is a timing diagram of communication for an example where the target frequency (channel) identified in a conditional handover is determined to be occupied. For the example of FIG. 4, the conditional handover (CHO) is authorized by the first base station 102 in a communication system utilizing unlicensed frequency bands for transmission and the UE device 106 attempts to perform the CHO to the target base station 103 when the handover conditions are met. The CHO does not have an expiration timer for the example and is only resolved by a CHO, deconfiguration or reconfiguration.

The example of FIG. 4 begins with the UE communication device 106 sending a measurement report at transmission 402. After measuring the appropriate channel parameters and determining the unlicensed uplink channel is clear, the UE device 402 sends the measurement report to the first base station 102 which is the serving base station in the example. In some circumstances, the UE device106 determines if measurement report trigger criteria have been met before transmitting the measurement report is transmitted.

At event 404, the first base station 102 performs a conditional handover decision. To support a conditional handover decision, the first base station 102 must prepare the target base station 103. If more than one base station is a potential CHO target, all the potential target base stations are prepared. This preparation includes sending the target base stations the UE's context as well as the Admission Control procedure 408. This is necessary since the UE device 106 is not ready to perform a handover at that time. Therefore, any one of the prepared target base stations can potentially become the base station to which the UE device 106 is handed over.

At transmission 406, the first base station 102 sends a handover request to the second base station 104 which is the target base station. For the example, communication between the base stations is through the backhaul 105 which does not utilize the unlicensed channels.

At event 408, the second bases station performs admission control. The admission control procedure admits or rejects the establishment requests, including handovers for new radio bearers. In order to do this, admission control takes into account the overall resource situation in the network, the QoS requirements, the priority levels and the provided QoS of in-progress sessions and the QoS requirement of the new radio bearer request.

At transmission 410, the second base station sends a handover acknowledgment to the first base station. The target base station sends the handover acknowledgement after the required resources for all accepted radio bearers are allocated. If no resources are available on the target side, the target eNB responds with the handover NACK message or the handover failure message instead.

At event 412, the first base station performs an LBT procedure by observing the unlicensed downlink channel to determine if it is occupied. When the channel is unoccupied, the first base station transmits a conditional handover command to the UE device at transmission 414. The conditional handover command indicates that a handover is authorized. In accordance with conventional techniques, the CHO will remain pending until the CHO is performed or the CHO is reconfigured or deconfigured.

At event 416, the UE device makes a decision to perform a handover. The decision may be triggered by the original conditions when the measurement report was sent or may be, at least partially, based on a change in conditions. Therefore, the threshold for triggering the measurement report for a conditional handover may be different from a conventional handover threshold. The early decision by the first base station (serving gNB) to send the conditional handover command provides the UE device with additional flexibility on when to access the target cell as compared to systems that do not support conditional handovers. With such techniques, it may not be possible to send the measurement report when needed due to the required LBT procedures. Also, with techniques not employing CHO, there may be delays in sending a handover command due to LBT procedures. With the CHO, the trigger to handover to the second base station (target gNB) is still based on the configured measurement threshold. Embedded within the conditional handover command is another measurement threshold that may be different from the measurement threshold configured to the UE device 106 for the purposes of measurement report. The measurement threshold within the conditional handover tells the UE device at what radio signal level the UE device should trigger the handover to the target base station.

At event 418, the UE device performs an LBT check. The UE device observes the unlicensed uplink channel that will be used for transmission and determines if the channel is unoccupied. The UE device may determine, for example, whether the level of measured energy in the channel is above a threshold.

When the channel is determined to be unoccupied, the UE device performs synchronization to the target gNB and accesses the target cell via the random access transmission 420 as part of the random access procedure which will also include UL resource allocation, timing alignment from the second base station. When the channel operated by the target gNB is occupied as determined at event 419, however, the UE device 106 cannot access the target cell via the random access transmission 420. After performing an LBT check at event 422, the UE device 106 informs the source gNB 102 of the channel occupancy with the CHO-unavailable transmission 424. In some circumstances, a CHO-unavailable indicator 101 is transmitted to the gNB 102. Such an indicator may only indicate the CHO is not possible or may provide an indication that the target channel provided in the CHO command is occupied. In other situations, a measurement report is sent either as the CHO-unavailable indicator 101 or in addition to the CHO-unavailable indicator 101. For the example, the measurement report includes an RSSI measurement and a channel occupancy indicator for each target cell frequency determined to be unavailable for the CHO. Therefore, a measurement is sent in some of the examples in response to target channels being occupied which is not performed in conventional systems. As discussed above, there is no mechanism in conventional systems for informing the serving gNB that target channels are occupied and the CHO remains pending until the CHO is completed, the CHO is deconfigured (i.e., revoked, cancelled) or the CHO is reconfigured with new parameters.

After receiving the CHO-unavailable indicator 101, the gNB performs an LBT check at event 426 before transmitting a CHO command at transmission 428 the deconfigures or reconfigures the previous CHO.

Figure 5:
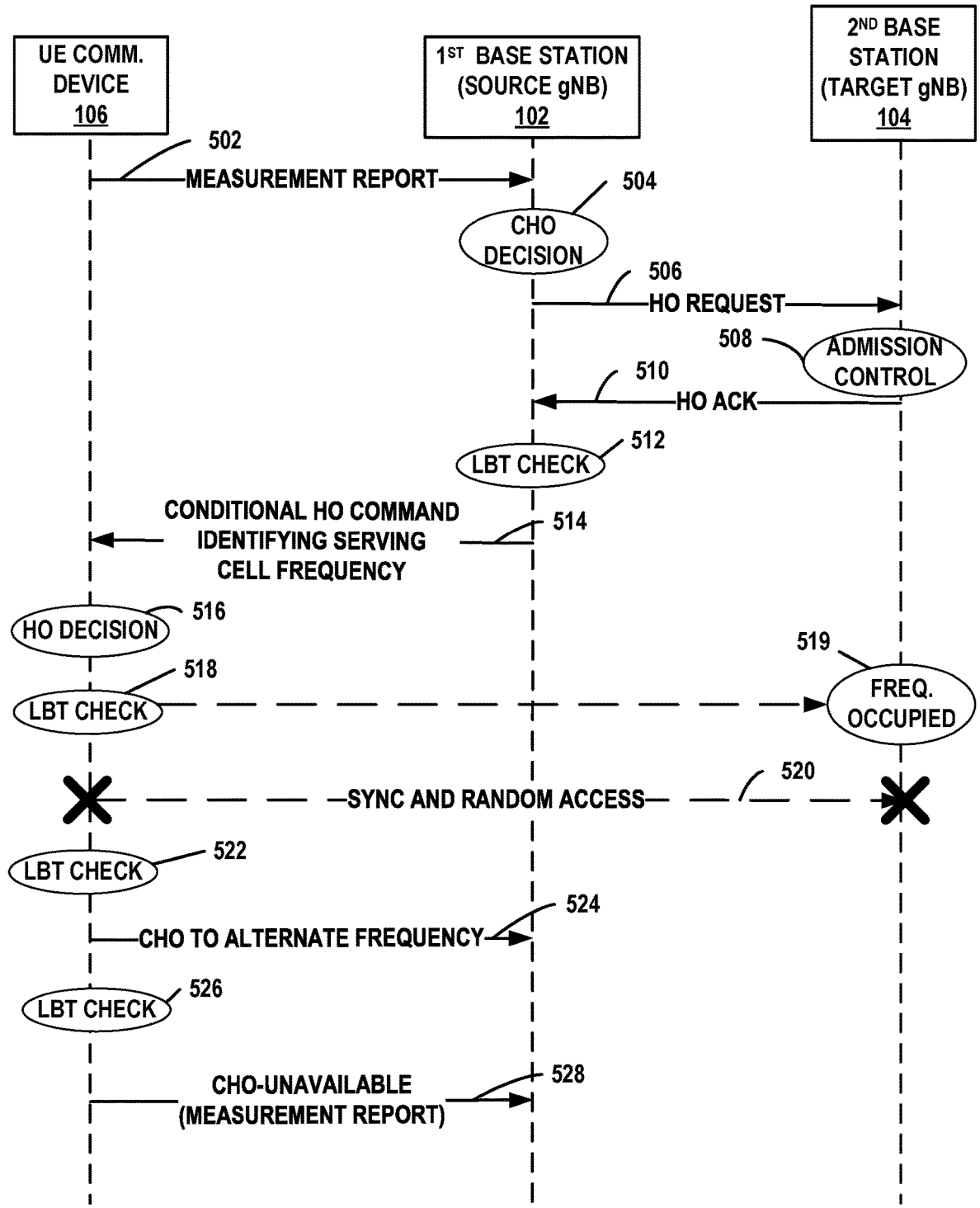
FIG. 5 is a timing diagram of communication for an example where the target frequency identified in a conditional handover is determined to be occupied and the conditional handover identifies a source cell channel as one of the target channels for the CHO.

FIG. 5 is a timing diagram of communication for an example where the target frequency identified in a conditional handover is determined to be occupied and the conditional handover identifies a least one source cell channel as an alternate channels for the CHO. For the example of FIG. 5, the conditional handover (CHO) is authorized by the first base station 102 in a communication system utilizing unlicensed frequency bands for transmission and the UE device 106 attempts to perform the CHO to the target base station 103 when the handover conditions are met.

The example of FIG. 5 begins with the UE communication device 106 sending a measurement report at transmission 502. After measuring the appropriate channel parameters and determining the unlicensed uplink channel is clear, the UE device 402 sends the measurement report to the first base station 102 which is the serving base station in the example. In some circumstances, the UE device 106 determines if measurement report trigger criteria have been met before transmitting the measurement report is transmitted.

At event 504, the first base station 102 performs a conditional handover decision. To support a conditional handover decision, the first base station 102 must prepare the target base station 103. If more than one base station is a potential CHO target, all the potential target base stations are prepared. This preparation includes sending the target base stations the UE device's context as well as the Admission Control procedure 508.

At transmission 506, the first base station 102 sends a handover request to the second base station 103 which is the target base station. For the example, communication between the base stations is through the backhaul 105 which does not utilize the unlicensed channels.

At event 508, the second bases station performs admission control. The admission control procedure admits or rejects the establishment requests, including handovers for new radio bearers. In order to do this, admission control takes into account the overall resource situation in the network, the QoS requirements, the priority levels and the provided QoS of in-progress sessions and the QoS requirement of the new radio bearer request.

At transmission 510, the second base station sends a handover acknowledgment to the first base station. The target base station sends the handover acknowledgement after the required resources for all accepted radio bearers are allocated. If no resources are available on the target side, the target eNB responds with the handover NACK message or the handover failure message instead.

At event 512, the first base station performs an LBT procedure by observing the unlicensed downlink channel to determine if it is occupied. When the channel is unoccupied, the first base station transmits a conditional handover command to the UE device at transmission 414. The conditional handover command indicates that a handover is authorized. In accordance with conventional techniques, the CHO will remain pending until the CHO is performed or the CHO is reconfigured or deconfigured. The CHO indicates at least two target channels where one of the target channels is serving cell channel of the serving gNB 102. For the example, the CHO command includes at least one other target channel such a channel of the second base station (second gNB) 103.

At event 516, the UE device makes a decision to perform a handover. As discussed above, the decision may be triggered by the original conditions when the measurement report was sent or may be, at least partially, based on a change in conditions. Therefore, the threshold for triggering the measurement report for a conditional handover may be different from a conventional handover threshold in some situations. The process for determining the CHO should be performed is discussed above with reference to event 416.

At event 518, the UE device performs an LBT check. The UE device observes the unlicensed uplink channel that will be used for transmission and determines if the channel is unoccupied. The UE device may determine, for example, whether the level of measured energy in the channel is above a threshold.

When the channel is determined to be unoccupied, the UE device performs synchronization to the target gNB and accesses the target cell via the random access transmission 520 as part of the random access procedure which will also include UL resource allocation, timing alignment from the second base station. When the channel operated by the target gNB is occupied, however, the UE device 106 cannot access the target cell via the random access transmission 520.

In response to the occupied target channel, the UE device 106 performs a CHO to an alternate channel of the serving cell of the serving base station 102. For the example, the UE device 106 only performs a handover to the serving gNB when all target channels identified by the CHO command are occupied. After performing an LBT check at event 522, the UE device initiates the CHO to the alternate channel of the serving base station at transmission 524 if the channel is unoccupied. The UE device performs an LBT check at event 526 before transmitting the CHO-unavailable indicator at transmission 528. If all the target channels and all the alternate channels of the serving cell are occupied and connection is lost to the serving cell, the UE device declares radio link failure and transitions to IDLE mode for the examples herein. However, the UE device does not discard the configured CHO while in IDLE, performs cell reselection while in IDLE, and performs connection re-establishment. If the reselected cell is one of the cells listed in the CHO, the cell would already have the UE device's context as part of the HO request/response procedure in transmissions 506 and 510.

For the example of FIG. 5, the UE device 106 informs the source gNB 102 of the channel occupancy with the CHO-unavailable transmission 528 of the non-serving cell target channels. In some circumstances, a CHO-unavailable indicator 101 is transmitted to the gNB 102. Such an indicator may only indicate the CHO is not possible or may provide an indication that the target channel provided in the CHO command is occupied. In other situations, a measurement report is sent either as the CHO-unavailable indicator 101 or in addition to the CHO-unavailable indicator 101. For the example, the measurement report includes an RSSI measurement and a channel occupancy indicator for each target cell frequency determined to be unavailable for the CHO. In some situations, the CHO-unavailable transmission 528 is omitted if the frequency of the serving cell is also occupied. As discussed above, the UE device declares radio link failure and transitions to IDLE mode if both the target cells and serving cell are occupied. The UE device does not discard the configured CHO while in IDLE, performs cell reselection while in IDLE and performs connection re-establishment. If the reselected cell is one of the cells listed in the CHO, the cell already has the UE device's context as part of the HO request/response procedure in steps 506 and 510.

Figure 6:
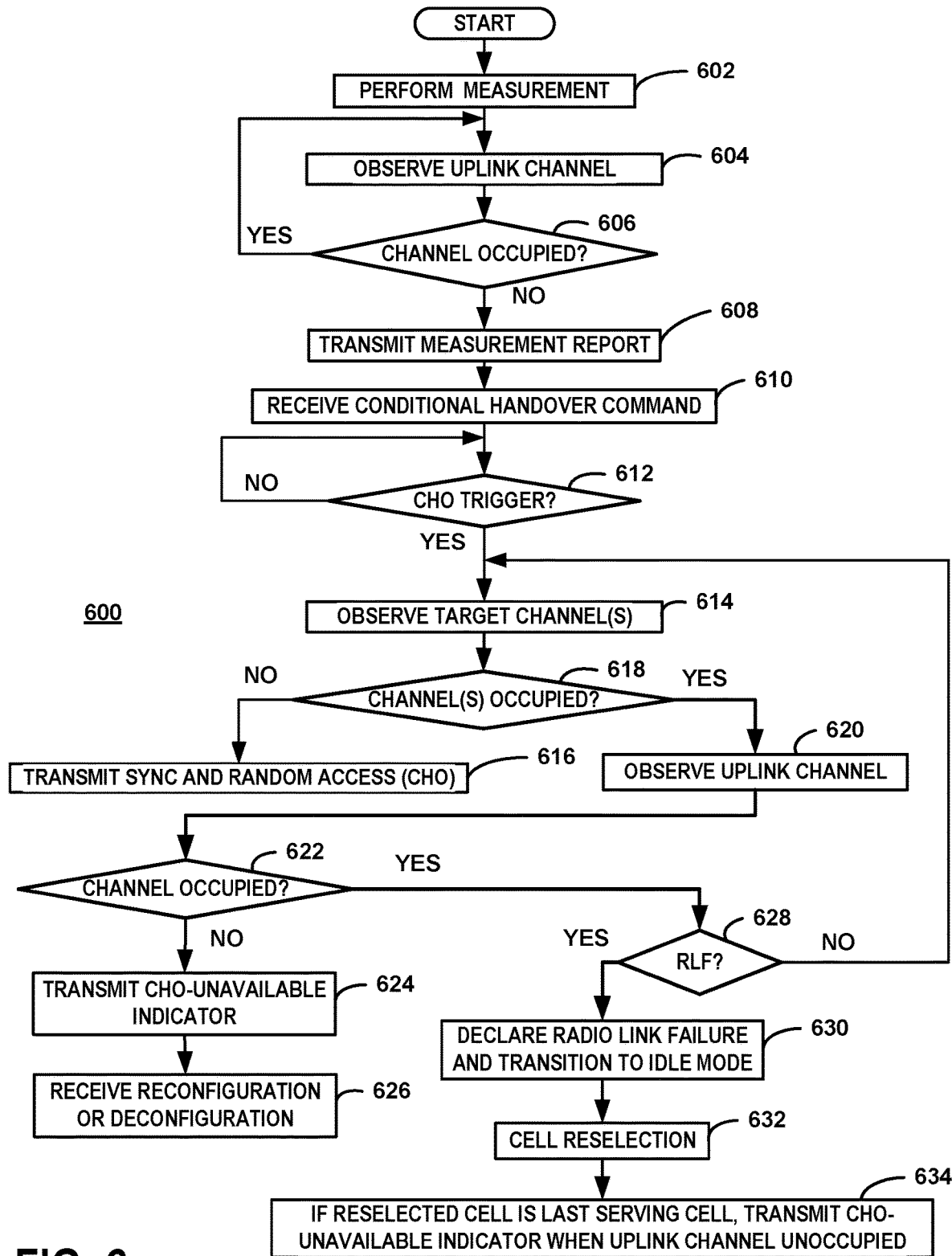
FIG. 6 is a flow chart of an example of a method of managing handovers with conditional handover commands.

FIG. 6 is a flow chart of an example of a method of managing handovers with conditional handover commands. The method is performed by a UE device operating in a NR-U SA system such as the system 100 described above. Accordingly, the method may be performed by the UE device 106.

At step 602, a measurement for generating a measurement report is made. In accordance with instructions from the serving base station (first base station), the UE device determines parameters of received signals from the serving base station and at least one target base station. For event-triggered measurement, measurement reports are only sent if the measured value(s) are above the configured thresholds. Therefore, the measurement report trigger conditions must be met before UE device transmits the measurement report.

At step 604, the unlicensed uplink channel is observed. The UE device performs an LBT process to determine if the channel is occupied.

At step 606, it is determined where the uplink channel is occupied. Based on the results measured at step 604, the UE device determines whether the channel is occupied. For example, one or more measured energy parameters of the channel may be compared to a threshold. If the channel is occupied, the UE continues to observe the channel and returns to step 604. Otherwise, the method continues to step 608. If the uplink channel continues to be occupied, the measurement performed in step 602 may no longer be valid since the UE device's current measurement may no longer be above the configured thresholds. The serving base station may configure the UE device with a condition when the previous event trigger may still be used to send the measurement report (even if the current measurement is no longer above the configured threshold). This condition may be a new timer that defines the validity time of the initial measurement report trigger. Alternatively, the condition may be defined as range value "alpha" dB below the measurement threshold. If the current measurement value is more than alpha dB below the configured threshold, the UE device does not attempt to send the measurement report even if the channel is unoccupied. In this case, the procedure will be restarted at step 602.

At step 608, the measurement report is transmitted to the first base station (serving gNB). The measurement process and the transmission of the measurement report may be triggered by conditions established by the network.

At step 610, a conditional handover command is received. As discussed above, the conditional handover command for the examples is valid until executed, reconfigured, or deconfigured.

At step 612, it is determined whether a conditional handover trigger has been met. The UE device observes channel conditions and determines whether the handover procedure should be performed. The UE device continues to monitor conditions if the trigger has not been met. Otherwise, the method proceeds to step 614.

At step 614, the target channels (frequencies) of the target base stations (target gNBs) are observed. For example, the unlicensed uplink channel the second base station indicated in the CHO command as a target frequency is observed.

At step 616, it is determined whether a target channel to the target base station (second base station) is occupied. Based on the results measured at step 614, the UE device determines whether the channel is occupied. For example, one or more measured energy parameters of the channel may be compared to a threshold. If a target channel is unoccupied, the UE device performs the CHO by performing an uplink synchronization and random access process at step 618. The process begins with the synchronization to the second base station (target) via the random access procedure. 618. If the target channels are occupied, the method continues to step 620.

At step 620, the uplink channel to the first base station (serving gNB) is observed.

At step 622, it is determined whether the uplink channel is occupied. If the uplink channel is unoccupied, the method continues at step 624.

At step 624, the serving base station (first base station) is notified that the target frequency for the CHO are occupied. As discussed above, a CHO-unavailable indicator 101 may be transmitted to the gNB 102. Such an indicator may only indicate the CHO is not possible or may provide an indication that the target channel(s) provided in the CHO command is/are occupied. In other situations, a measurement report is sent either as the CHO-unavailable indicator 101 or in addition to the CHO-unavailable indicator 101. For the example, the measurement report includes an RSSI measurement and a channel occupancy indicator for each target cell frequency determined to be unavailable for the CHO. Therefore, a measurement is sent in some of the examples in response to target channels being occupied which is not performed in conventional systems. As discussed above, there is no mechanism in conventional systems for informing the serving gNB that target channels are occupied and the CHO remains pending until the CHO is completed, the CHO is deconfigured (i.e., revoked, cancelled) or the CHO is reconfigured with new parameters.

At step 626, the UE device receives a CHO reconfiguration or a CHO deconfiguration.

If at step 622, it is determined that the uplink channel to the serving base station is occupied, the method proceeds to step 628 where it is determined whether a radio link failure (RLF) has occurred. For the example, the determination is based on the N310 counter and T310 timer in accordance with known techniques. If the T310 timer has not expired, the method returns to step 614 to continue observing the target channels. Otherwise, the method proceeds to step 630.

At step 630, the UE device declares radio link failure and transitions to IDLE mode in accordance with known techniques. At step 632, the UE device performs cell reselection.

At step 634, the UE device transmits the CHO-unavailable indicator if the reselected call is the last serving cell. When the uplink channel to the serving base station is unoccupied, the UE device transmits the CHO unavailable indicator.

Figure 7:
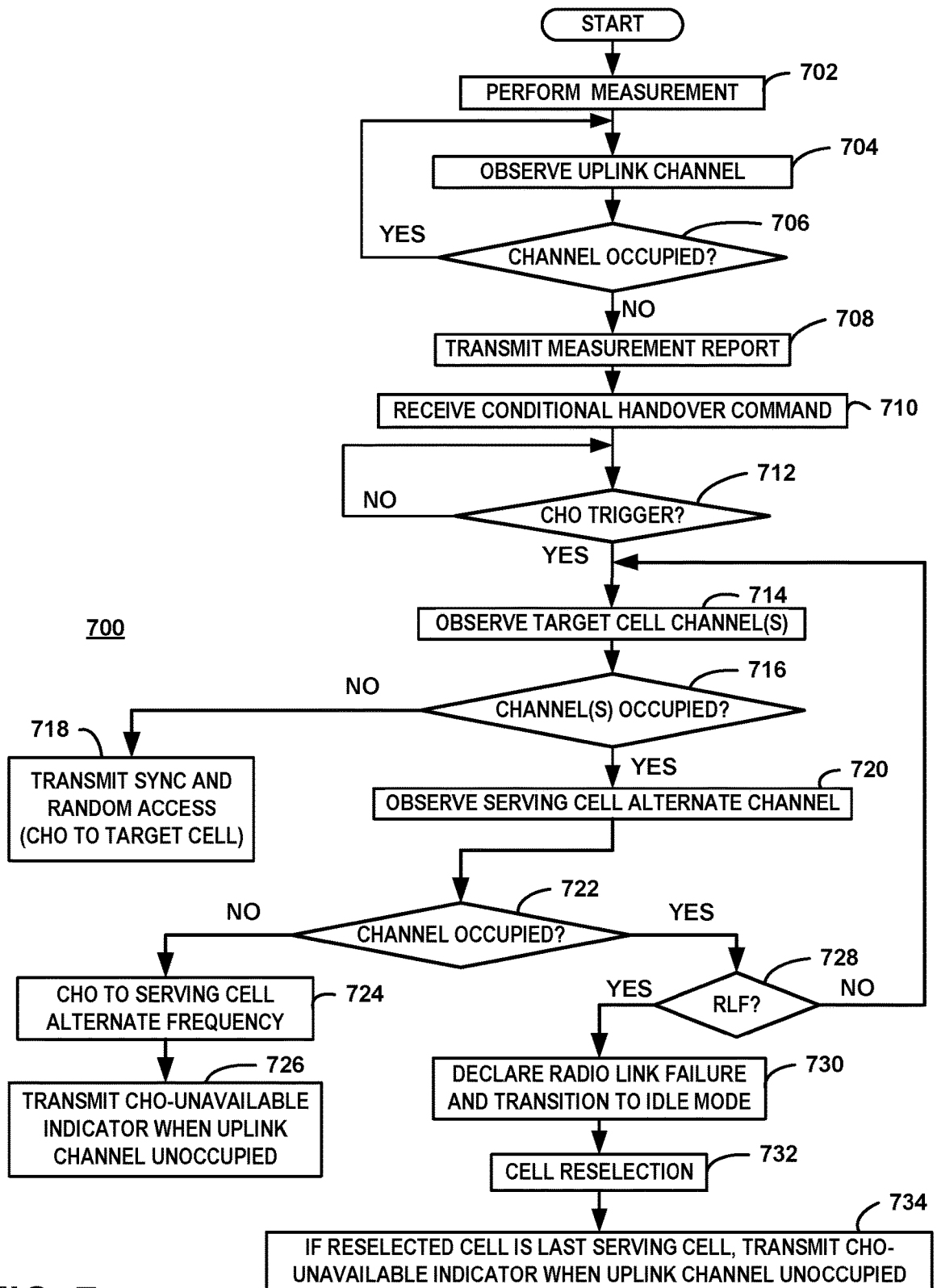
FIG. 7 is a flow chart of an example of a method of managing conditional handovers where serving cell channels are included as target channels in the CHO command.

FIG. 7 is a flow chart of an example of a method of managing conditional handovers where serving cell alternate channels are included in the CHO command. The method is performed by a UE device operating in a NR-U SA system such as the system 100 described above. Accordingly, the method may be performed by the UE device 106.

At step 702, a measurement for generating a measurement report is made. In accordance with instructions from the serving base station (first base station), the UE device determines parameters of received signals from the serving base station and at least one target base station. For event-triggered measurement, measurement reports are only sent if the measured value(s) are above the configured thresholds.

At step 704, the unlicensed uplink channel is observed. The UE device performs an LBT process to determine if the channel is occupied.

At step 706, it is determined whether the uplink channel is occupied. Based on the results measured at step 704, the UE device determines whether the channel is occupied. For example, one or more measured energy parameters of the channel may be compared to a threshold. If the channel is occupied, the UE continues to observe the channel and returns to step 704. Otherwise, the method continues to step 708. If the uplink channel continues to be occupied, the measurement performed in step 702 may no longer be valid since the UE device's current measurement may no longer be above the configured thresholds. The serving base station may configure the UE device with a condition when the previous event trigger may still be used to send the measurement report (even if the current measurement is no longer above the configured threshold). This condition may be a new timer that defines the validity time of the initial measurement report trigger. Alternatively, the condition may be defined as range value "alpha" dB below the measurement threshold. If the current measurement value is alpha dB below the configured threshold, the UE will not attempt to send the measurement report even if the channel is unoccupied. In this case, the procedure will be restarted at step 702.

At step 708, the measurement report is transmitted to the first base station (serving gNB). The measurement process and the transmission of the measurement report may be triggered by conditions established by the network.

At step 710, a conditional handover (CHO) command with at least one target frequency and at least one alternate frequency of the serving cell is received. The CHO command may include more than one target frequency and more than one serving cell alternate frequency.

At step 712, it is determined whether the CHO trigger has been met. If the trigger has been met, the method proceeds to step 714. Otherwise, the method continues monitoring for the CHO trigger.

At step 714, the non-serving cell target channels (frequencies) are observed.

At step 716, the UE device determines if the non-serving cell target channels are occupied. If at least one non-serving cell target channel is unoccupied, the method continues at step 718. Otherwise, the method proceeds to step 720.

At step 718, the UE device performs the CHO by performing an uplink synchronization and random access process. The process begins with the synchronization to the second base station (target) via the random access procedure.

At step 720, the serving cell alternate channels are observed.

At step 722, it is determined whether any of the serving cell alternate frequencies are unoccupied. If at least one serving cell alternate frequency is unoccupied, the method continues at step 724.

At step 724, the UE device performs the CHO to the serving cell alternate frequency.

For the example of FIG. 7, the UE device transmits a CHO-unavailable indicator and/or a measurement report to the serving base station if no target channels are unoccupied as determined at step 716. At step 726, the UE device transmits the CHO-unavailable indicator and/or a measurement report to the serving base station when the uplink channel to the serving base station 102 is unoccupied.

If at step 722, it is determined that the uplink channel to the serving base station is occupied, the method proceeds to step 728 where it is determined whether a radio link failure (RLF) has occurred. For the example, the determination is based on the N310 counter and T310 timer in accordance with known techniques. If the T310 timer has not expired, the method returns to step 714 to continue observing the target channels. Otherwise, the method proceeds to step 730.

At step 730, the UE device declares radio link failure and transitions to IDLE mode in accordance with known techniques. At step 732, the UE device performs cell reselection.

At step 734, the UE device transmits the CHO-unavailable indicator if the reselected call is the last serving cell. When the uplink channel to the serving base station is unoccupied, the UE device transmits the CHO unavailable indicator.

Figure 8:
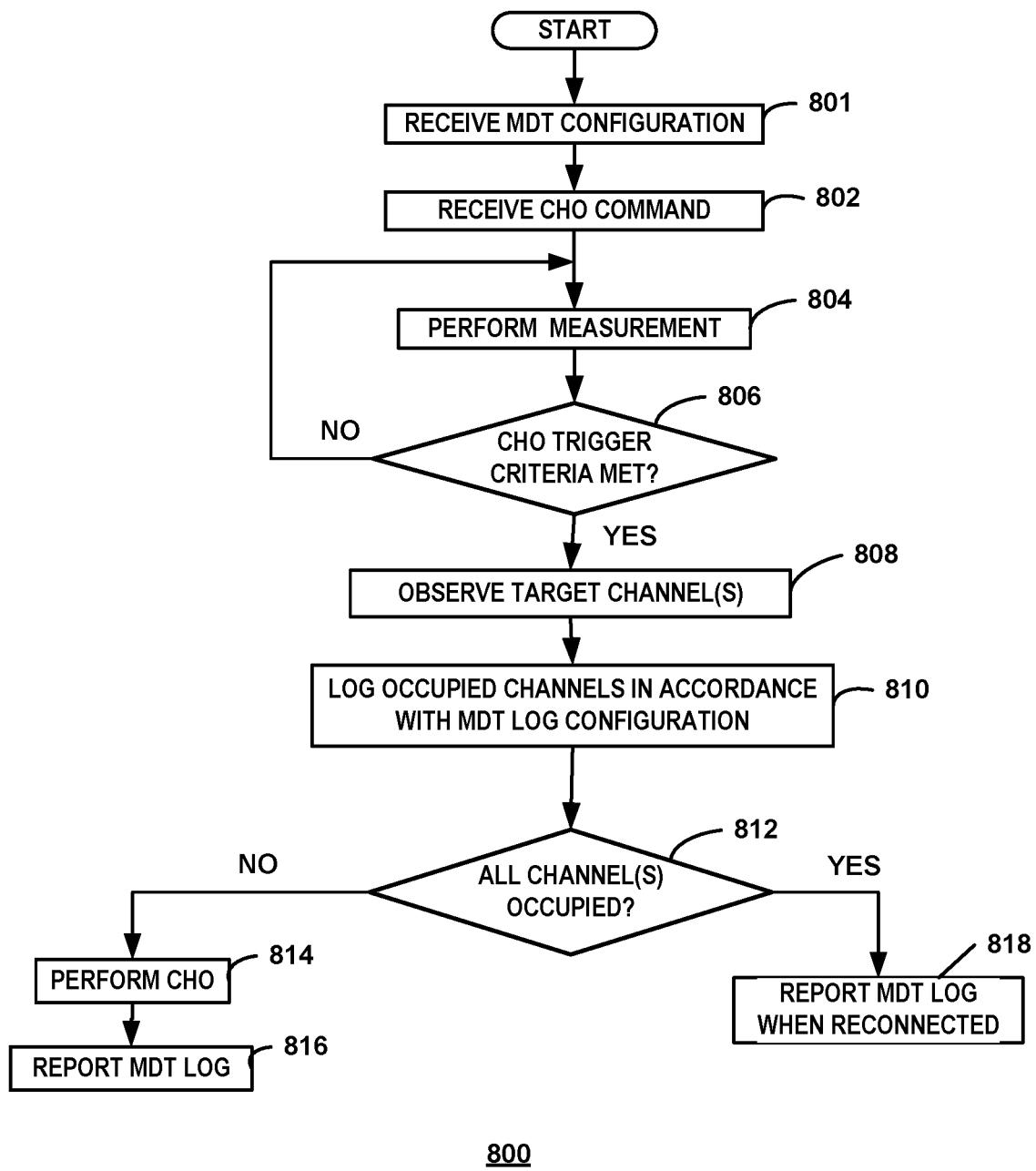
FIG. 8 is a flow chart of an example of a method of informing the network of occupied target channels using a minimum drive test (MDT) logging procedure.

FIG. 8 is a flow chart of an example of a method of informing the network of occupied target channels using a minimum drive test (MDT) logging procedure. The method is performed by a UE device operating in a NR-U SA system such as the system 100 described above. Accordingly, the method may be performed by the UE device 106. The method may be performed in situations where the UE device loses connection to the network after a CHO failure due to occupied target channels.

At step 801, MDT configuration information is received from the network. For the example, the serving base station 102 sends the MDT configuration in accordance with known techniques except that the configuration includes information regarding performing MDT for unlicensed target frequencies that are unavailable (occupied). The MDT configuration may be for Immediate MDT, Logged MDT, or both. The configuration provides for the UE device logging at least a list of target frequencies that have been found to be occupied. The logged information may also include RSSI values, location information, time stamps, cell IDs, a wireless local area network service set identifier (WLAN SSID) and/or a base service set identifier (BSSID).

At step 802, a CHO command is received. The CHO command provides the target cells and frequencies for executing a CHO by the UE device.

At step 804, the channel measurement is performed. Signals are received from non-serving base station and/or serving the serving base station. Quality and/or power measurements are performed on the received signals.

At step 806, it is determined if the trigger criteria for the CHO is met. The signals received from non-serving base stations and/or the serving base station are compared to thresholds. If the criteria have been met, the method continues at step 808. Otherwise, the method returns to step 804 to continue monitoring conditions.

At step 808, the one or more unlicensed target channels are observed. The UE device performs an LBT process to determine if the channel is occupied.

At step 810, all occupied target frequencies are logged in accordance with the MDT configuration. For example, one or more measured energy parameters of each target channel may be compared to thresholds to determine if the channel is occupied.

At step 812, it is determined whether all the target frequencies are occupied. Based on the results measured at step 808, the UE device determines whether all of the target channels in the CHO command are occupied. If at least one target channel is unoccupied, the method continues at step 814.

At step 814, the CHO is executed to the unoccupied target channel. Accordingly, the UE device performs the uplink synchronization and random access process.

At step 816, the UE device reports the MDT log to the network.

If it is determined at step 812 that all target channels are occupied, the method proceeds to step 818. For the example, the UE device loses connection to the network if no channels are available for the CHO. This may occur, for example, because signals conditions have deteriorated and UE device is not able to perform a handover to a new cell. In some situations, the UE device may transition to the IDLE state and then perform a reconnection procedure. Regardless of the particular circumstances for the lost connection, the UE device reports the MDT log when the UE device reestablishes connection with the network. The process discussed with reference to FIG. 8 may be combined with the other techniques discussed above. For example, the UE device may transmit a measurement report and/or CHO-unavailable indicator 101 in response to identifying occupied target channels in addition to providing an MDT log. Also, the CHO command may include serving cell target frequencies which allows the UE device to remain connected to the network and report the MDT log. The MDT log provide information to the network and/or specific base stations that facilitates decisions regarding target frequencies for CHOs and/or HOs. For example, target frequencies identified as occupied may be eliminated or least deprioritized when generating future CHOs.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a communication device, the method comprising:
   receiving, from a serving base station providing a source cell, a conditional handover command identifying a target frequency on a target cell for conditional handover;
   determining conditions have been met for the conditional handover;
   determining the target frequency is not available for the conditional handover; and
   transmitting, to the serving base station, an indication that the target frequency is unavailable for the conditional handover.

2. The method of claim 1, wherein the conditional handover command comprises a plurality of target frequencies and the indication identifies each target frequency determined to be unavailable for the conditional handover.

3. The method of claim 2, further comprising: receiving an updated conditional handover command that does not include each target frequency determined to be unavailable for the conditional handover.

4. The method of claim 1, wherein the transmitting the indication comprises transmitting a measurement report indicating at least a Received Signal Strength Indicator (RSSI) measurement and a channel occupancy indicator for each target cell frequency determined to be unavailable for the conditional handover.

5. The method of claim 1, where in the conditional handover command further indicates a source cell frequency for the conditional handover, the method further comprising:
   in response to determining the target cell target frequency is unavailable for the conditional handover, performing the conditional handover to the source cell frequency.

6. The method of claim 1, further comprising: receiving an updated conditional handover command that does not include the target frequency.

7. The method of claim 1, further comprising performing a minimum drive test (MDT) logging procedure comprising:
   logging MDT logged information identifying at least one target cell frequency unavailable for the conditional handover and comprising at least one of a channel occupancy of the at least one target cell frequency, an Received Signal Strength Indicator (RSSI) of the at least one target cell frequency, a location, a time stamp, a cell ID, a wireless local area network service set identifier (WLAN SSID), and a base service set identifier (BSSID); and
   reporting the MDT logged information to a network of the base station after connection to the network.

8. A user equipment communication device (UE device) comprising:
- a receiver configured to receive, from a serving base station providing a source cell, a conditional handover command identifying a target frequency on a target cell for conditional handover;
- a controller configured to determine that conditions have been met for the conditional handover and to determine that the target frequency is not available for the conditional handover; and
- a transmitter configured to transmit, to the serving base station, an indication that the target frequency is unavailable for the conditional handover.

9. The UE device of claim 8, wherein the conditional handover command comprises a plurality of target frequencies and the indication identifies each target frequency determined to be unavailable for the conditional handover.

10. The UE device of claim 9, the receiver further configured to receive an updated conditional handover command that does not include each target frequency determined to be unavailable for the conditional handover.

11. The UE device of claim 8, wherein the transmitted is configured to transmit a measurement report indicating at least a Received Signal Strength Indicator (RSSI) measurement and a channel occupancy indicator for each target cell frequency determined to be unavailable for the conditional handover.

12. The UE device of claim 8, where in the conditional handover command further indicates a source cell frequency for the conditional handover, the controller further configured to, in response to determining the target cell target frequency is unavailable for the conditional handover, perform the conditional handover to the source cell frequency.

13. The UE device of claim 8, the receiver further configured to receive an updated conditional handover command that does not include the target frequency.

14. The UE device of claim 8, the controller configured to perform a minimum drive test (MDT) logging procedure comprising:
- logging MDT logged information identifying at least one target cell frequency unavailable for the conditional handover and comprising at least one of a channel occupancy of the at least one target cell frequency, an Received Signal Strength Indicator (RSSI) of the at least one target cell frequency, a location, a time stamp, a cell ID, a wireless local area network service set identifier (WLAN SSID), and a base service set identifier (BSSID), the transmitter configured to transmit the MDT logged information to a network of the base station after connection to the network.

* * * * *